Aug. 9, 1966  H. L. PAUL, JR  3,264,718
METHOD FOR MAKING BALL VALVES
Filed Nov. 19, 1962
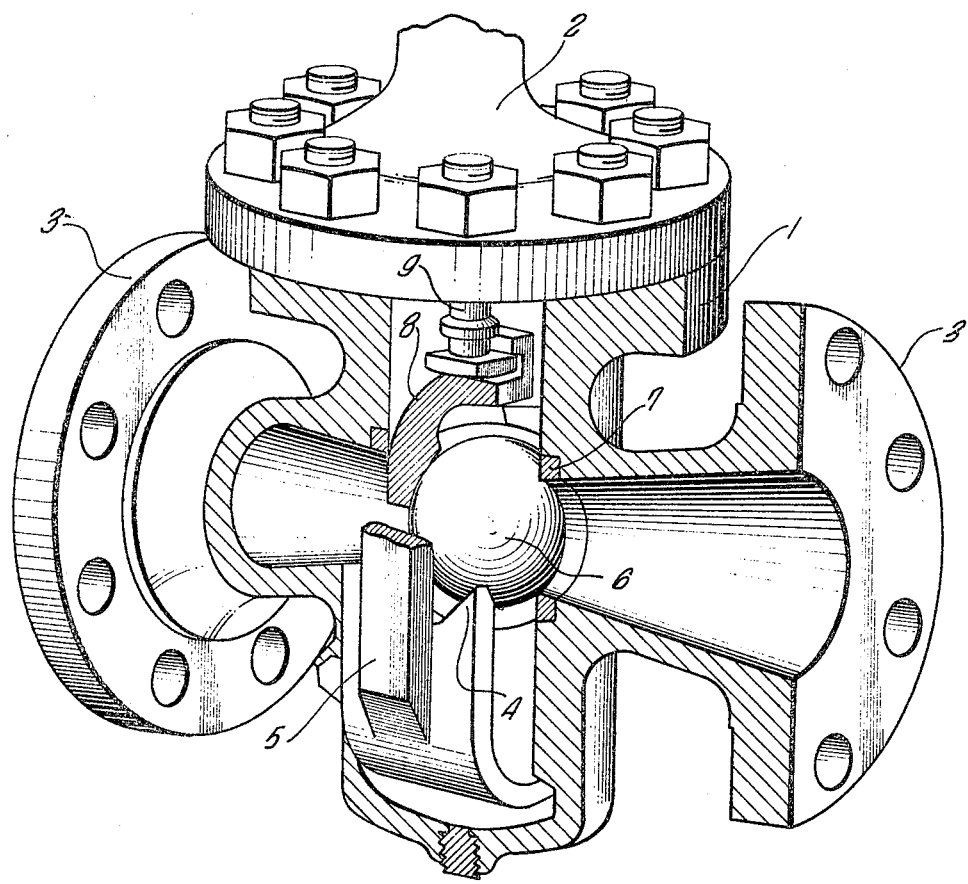
INVENTOR.
HERMAN L. PAUL, JR.
BY
Christie, Parker & Hale
ATTORNEYS United States Patent Office 3,264,718
Patented August 9, 1966

3,264,718
METHOD FOR MAKING BALL VALVES
Herman L. Paul, Jr., Wayne, N.J., assignor to Consolidated Electrodynamics Corporation, Pasadena, Calif., a corporation of California
Filed Nov. 19, 1962, Ser. No. 238,639
3 Claims. (Cl. 29—157.1)

This invention relates to a method for making ball valves, and particularly to a method for finishing seat rings and wedging devices for ball valves.

In a ball valve, the valve is closed by placing a spherical ball against a circular seat ring disposed at the opening of the conduit line. The ball is often locked in place by the provision of a wedging device to firmly hold it against the seat ring. Proper closure of the valve depends upon a perfect fit between the ball and its seat ring, as well as between the ball and the wedging device. A properly constructed ball valve gives such accurate and tight-fitting closure that industrial use of such valves is widespread.

Heretofore, a fit between the ball and seat ring, and the ball and the wedging device, has been obtained by an operation in the manufacturing process known as lapping, the final step in manufacture of the seat rings and wedging devices which may be referred to as a finishing step. Lapping is time consuming and expensive, requiring two steps: The first step involves polishing, or burnishing, the surface of the seat ring with a lapping compound and a rotating disc having a beveled edge. The second step requires further burnishing by rotatingly engaging a ball of the desired dimensions with the seat, and the use of further lapping compounds until the ball-contacting surfaces of the seat ring and wedging device attain a smoothness approximating that of the surface of the ball, which surfaces may then be referred to as burnished ball-contacting surfaces. The lapping compounds must then be completely removed. Both steps require proper equipment, lapping compounds, and highly-skilled personnel. The resultant fit, although normally satisfactory, is at times not perfect, due to minor variations in either the balls or in the seat ring surfaces occurring during lapping. Under extremely high line pressures such as those to which ball valves are frequently exposed, it is apparent that even the smallest opening between ball and seat could result in serious leakage.

The present invention not only insures a perfect fit between ball and seat ring, but completely eliminates the necessity for the entire conventional lapping operation. In accordance with the present invention, the ball to be used in the ball valve is made from an extremely hard, normally a non-metallic material capable of producing a burnished surface upon the relatively softer metals from which the wedging device and seat ring are normally made. The seat ring and wedging device are manufactured in the usual manner except that the lapping operation is omitted. Then all of the elements including the unlapped seat rings and wedging device are assembled into the final complete valve assembly in which they will remain. The completed valve is then opened and closed for a plurality of times, the exact number being determined by the size of the valve and the relative hardnesses of the materials chosen. During this opening and closing, which may be referred to as cycling, the hard ball repeatedly engages the seat ring and wedging device, and by doing so, produces a burnished surface upon them at the points of engagement. It is a feature of ball valves that the ball rotates in operation, engaging at an infinite number of points on its surface with the seat ring. Thus the ball wears evenly.

When the ball valve is made in accordance with this invention, each seat ring and wedging device is polished to precisely fit the same ball which in actual operation will be engaged with it, insuring perfect valve closure. In the event of replacement of a seat ring due to wear during the life of the valve, the cycling operation may again be performed before the valve is placed back in operation, and a perfect fit again insured with the replacement ring. In both a new valve assembly and in the case of replacement of a seat ring, the cycling operation serves to test the assembly and therefore serves an additional useful purpose.

This invention may be better understood by reference to the accompanying drawing, in which the drawing is a perspective view of a completed ball valve assembly, partially cut away to show the valve in closed position.

Referring to the drawing, the valve consists of a body 1, a bonnet 2, and flanges 3 adapted to be connected to a conduit line (not shown). A ball 6, supported by a ball cage 5 with ball-engaging control surfaces 4, is disposed within the body. The ball cage 5 is adapted to move vertically when actuated by means (not shown) connected to the stem 9 to position the ball 6 against the seat ring 7. In the closed position, the ball 6 rests against the seat ring 7 and may be locked in place by the wedging device 8.

In accordance with the present invention, an unlapped seat ring 7 and an unlapped wedging device 8 are assembled into a complete ball valve, as shown in the drawing. The term "unlapped" is defined to mean a seat ring or a wedging device made in accordance with normal manufacturing processes, except omitting therefrom the final lapping operations, as above described.

A ball 6 is also assembled into the complete ball valve. The ball 6 is made of an exceptionally hard material such as an aluminum oxide of various compositions or other ceramic. The material from which the ball 6 is made must be of sufficient hardness to produce a burnished surface upon the materials from which the seat ring 7 and wedging device 8 are made, upon engagement therewith. In one preferred embodiment, a ceramic ball having a hardness of approximately 81N on a Rockwell 45N scale is used to produce such a burnished surface upon seat rings made from various cobalt-base alloys with hardnesses on the same Rockwell scale ranging from 45N to 60N. The actuating means (not shown) is then employed to cycle the assembled valve by raising and lowering the stem 9. The stem 9 is connected to the ball cage 5 which, when being raised, engages the ball 6 on its control surfaces 4, rolls the ball 6 away from the unlapped seat ring 7, and moves the ball away from the closed position. When the stem 9 is lowered, the ball cage 5 descends, replacing the ball 6 on the seat ring 7. Upon further lowering of the stem 9, the wedging device 8, also attached to the stem 9, engages the ball 6 and forces it firmly against the seat ring 7. The stem 9 is again raised and the cycle repeated until a satisfactory burnished surface has been created on the ball-engaging surfaces of the seat ring 7 and the wedging device 8. The number of cycles required is variable, depending upon the size of the valve and the relative hardnesses of the materials selected for the component parts.

There has thus been disclosed a unique process of manufacturing a ball valve, which completely eliminates the time, equipment, materials, and personnel formerly required for the conventional lapping operation, and in addition achieves a more perfect fit between the ball and its seat and wedging device, thus assuring more satisfactory valve operation.

I claim:
1. The process of finishing an unlapped seat ring for use in a high pressure ball valve of the type including a hard seat ring having a ball-contacting surface and a ball positionable against the ball-contacting surface of the seat ring to shut off essentially all flow of fluid through the valve, comprising the steps of:

(a) assembling the unlapped seat ring and a ball of ceramic material substantially harder than the material from which the seat ring is made, and capable of producing a burnished surface upon said seat ring upon repeated engagement therewith into a ball valve, (b) cycling the assembled ball valve between its open and closed conditions to engage the ball with the unlapped seat ring, and (c) repeating the cycling step for a plurality of times until the ball produces a burnished ball-contacting surface upon the seat ring effective in cooperation with the surface of the ball to provide an essentially fluid tight seal between the seat ring and the ball when the valve is in its closed condition.

2. The process according to claim 1 wherein the ball is made of a ceramic material having a hardness of substantially 81N on the Rockwell 45N scale, and the seat ring is made of a metallic material having a hardness in the range of 45N to 60N on the Rockwell 45N scale.

3. The process of finishing an unlapped seat ring and an unlapped wedging device for use in a high pressure ball valve of the type including a hard seat ring and wedging device made of a metallic material having a hardness in the range of 45N to 60N on the Rockwell 45N scale and having ball-contacting surfaces and a ball positionable between the ball-contacting surface of the seat ring and the wedging device to shut off essentially all flow of fluid through the valve, comprising the steps of:

(a) assembling into a ball valve the unlapped seat ring, the wedging device, and a ball made of a ceramic material having a hardness of substantially 81N on the Rockwell 45N scale and capable of producing a burnished surface upon the seat ring and wedging device materials upon repeated engagement therewith, (b) cycling the assembled ball valve between its open and closed conditions to engage the ball with the unlapped seat ring and the unlapped wedging device, and (c) repeating the cycling step for a plurality of times until the ball produces a burnished ball contact surface upon each of the seat ring and the wedging device effective in cooperation with the surface of the ball to provide an essentially fluid tight seal between the seat ring and the ball and effective to assure proper seating of the ball against the seat ring to provide said fluid tight seal when the valve is in its closed condition.

References Cited by the Examiner

UNITED STATES PATENTS

| 994,268 | 6/1911 | Milne et al. | |
|---|---|---|---|
| 1,041,945 | 10/1912 | Anderson. | |
| 2,904,877 | 9/1959 | Edelen | 29—157.1 |
| 2,666,617 | 1/1954 | Paul | 251—204 |

FOREIGN PATENTS

| 4,554 | 1876 | Great Britain. |
|---|---|---|
| 527,345 | 10/1940 | Great Britain. |

OTHER REFERENCES

Paul Valves Bulletin 103, printed by Paul Valve Corporation, 683 Third Avenue, New York 17, New York, 5M/10/50.

JOHN F. CAMPBELL, *Primary Examiner.*

WHITMORE A. WILTZ, *Examiner.*

J. D. HOBART, *Assistant Examiner.*